United States Patent [19]
Smalley et al.

[11] Patent Number: 5,316,432
[45] Date of Patent: May 31, 1994

[54] WHEELCHAIR LIFTS WITH AUTOMATIC BARRIER

[75] Inventors: Raymond L. Smalley; John C. Hall; Ryan J. Clouse; P. Fred Risner, all of Carey; Edward L. Strohm, Tiro, all of Ohio

[73] Assignee: REB Manufacturing Co., Inc., Carey, Ohio

[21] Appl. No.: 986,569

[22] Filed: Dec. 7, 1992

[51] Int. Cl.$^5$ ............................................... B60R 3/02
[52] U.S. Cl. ..................................... 414/540; 414/545; 414/921; 280/166; 187/9 R
[58] Field of Search ............... 414/540, 541, 545, 549, 414/921; 105/445, 447, 448; 187/9 R; 280/166

[56] References Cited

U.S. PATENT DOCUMENTS

| | | | |
|---|---|---|---|
| Re. 33,595 | 5/1991 | Sullivan et al. | 187/9 R |
| 3,955,827 | 5/1976 | Wonigar | 280/166 |
| 4,020,920 | 5/1977 | Abbott | 105/447 X |
| 4,022,337 | 5/1977 | Eichenhofer et al. | |
| 4,027,807 | 6/1977 | Thorley . | |
| 4,058,228 | 11/1977 | Hall | 414/549 |
| 4,081,091 | 3/1978 | Thorley . | |
| 4,124,130 | 11/1978 | Rohrs et al. | 414/921 X |
| 4,164,292 | 8/1979 | Karkau | 414/545 |
| 4,176,999 | 12/1979 | Thorley | 414/540 |
| 4,180,366 | 12/1979 | Roth et al. | 414/540 |
| 4,219,104 | 8/1980 | MacLeod | 187/9 R |
| 4,251,179 | 2/1981 | Thorley | 414/545 |
| 4,270,630 | 6/1981 | Karkau | 187/9 R |
| 4,441,850 | 4/1984 | Thorley | 414/545 |
| 4,466,771 | 8/1984 | Thorley et al. | 414/787 |
| 4,556,128 | 12/1985 | Thorley et al. | 187/9 R |
| 4,984,955 | 1/1991 | McCullough | 414/921 X |
| 5,110,252 | 5/1992 | Aoki | 414/921 X |

*Primary Examiner*—Michael S. Huppert
*Assistant Examiner*—James Keenan
*Attorney, Agent, or Firm*—Hugh Adam Kirk

[57] ABSTRACT

Steps are convertible into a platform of an elevator for wheelchairs such as installed in vehicles and buses, during which conversion a barrier is automatically raised from the bottom step to be at the outer edge of the platform. The barrier is operated by an extensible link under the bottom step, which link is connected between the barrier and a crank arm keyed to an oscillatible transverse shaft under the inner part of the bottom step. Two additional crank arms are keyed to the ends of this shaft and are connected to a frame for a step or riser to oscillate said shaft when the steps are extended and unfolded into their platform position. The extendible link extends the barrier into a ramp when the platform is in its lowest position for access by a wheelchair. Reciprocating motors such as hydraulic pistons extend, retract, fold and unfold the panels that form the steps and their intermediate risers. When the step panels are in the platform position, additional reciprocating motors raise and lower the platform as an elevator. Stabilizing chains and rack and pinion gears insure uniform motion of the sides of the elevator and of the extendible bottom step.

16 Claims, 15 Drawing Sheets

WHEELCHAIR LIFTS WITH AUTOMATIC BARRIER

BACKGROUND OF THE INVENTION

Automatic barriers for wheelchair lifts, which barriers convert into ramps when their platforms are in their lowermost positions, are known. Also wheelchair lifts formed by the unfolding of steps into a platform are also well known. Even automatic barriers which are controlled by the folding and unfolding of steps into a platform are known, which involve linkages to arms connected to the riser panel from the lowestmost step, such as disclosed in U.S. Pat. No. Re. 33,595 issued May 28, 1991. However, in the past these mechanisms have been quite complicated and often not sufficiently reliable to meet government safety standards.

SUMMARY OF THE INVENTION

Generally speaking, the step convertible platform lifts of this invention relate to a two-step lift with an extendible lower step and a three-step lift, each of which lifts has an automatic barrier that raises from the tread of the lower step as the steps are extended into a platform position.

Both of these two- and three-step lifts comprise a frame which mounts the elevator and which frame may be anchored in the entrance of a vehicle, such as a bus. Vertically slideable in this frame is a U-shaped elevator frame, the base of which U-shaped frame supports the platform when the steps are unfolded into their platform position. Connected between the frame and the elevator platform may be a pair of reciprocating motors, such as hydraulic pistons that can be connected either directly or through sprocket chains between the platform and the frame. Furthermore, there may be provided sprocket chains from each side of the frame around sprocket wheels mounted on the elevator to insure uniform motion of both sides of the elevator when separate parallel reciprocating motors are provided on opposite sides of the elevator.

A second pair of reciprocating motors are connected to the sides of the elevator and to a riser panel of each step lift, which second pair of motors operate to unfold the step panels into their platform position and vice versa. The outwardly extending lower step panels are supported by links pivoted to the sides of the U-shaped elevator frame.

Pivoted to the outer edge of the lower step in both the two- and 3-step lifts is a barrier panel that in step position folds back over the bottom step and acts as a tread therefor. Adjacent and below an inner part of the lower step is a transverse oscillatable shaft having integral radially extension arms or cranks connected thereto. A single extendible pivoted link is connected between one crank arm in the center of the shaft and to the center of the barrier. The other crank arms are at opposite ends of the shaft and are integrally connected to the frame for mounting the lowest riser of the three-step lift and by links and a short slotted bar for the extensible lower step of the two-step lift. On the other hand, in the three-step lift, the frame that mounts the lower riser which is integral with the oscillating shaft, rocks this shaft as the steps are unfolded to raise the barrier during the unfolding operation as distinguished from the two-step lift in which the extension of the lower step operates the automatic barrier.

The extendible lower step of the two-step lift is guided by parallel slots on each side of the elevator frame, through which slots extend a second transverse shaft that supports the frame that mounts the lower riser panel. This second transverse shaft remains relatively stationary during the extension and retraction of the lower step, which extension is extended and retracted by a separate reciprocating motor, which may be a transverse motor that operates a toggle mounted between the two transverse shafts. This second shaft in the two-step lift which extends through the side slots of the lower step frame may be provided with a rack and pinion mechanism at each end of this shaft for stabilizing the reciprocating motion of the extendible lower step. When the toggle nears the end of its spreading motion, it picks up the shorter slotted bar and its link connected to the other integral radially extending arms at each end of the oscillatable shaft to oscillate the shaft and raise the barrier into its barrier position. Then after the lower step has been extended in the two-step lift, the operation of the converting motor for converting the steps into a platform further extends the lower step by unfolding the lower riser to platform position in horizontal alignment with the upper step.

When the barrier has been automatically raised into its barrier position, a separate reciprocating motor comprises the extendible link. When this motor is operated it moves the barrier outwardly and downwardly into a ramp position. Then when the platform is at its lower or ground level position, a wheelchair may ride up this ramp easily to get upon the platform. To insure the position of the barrier into its ramp position, there are provided a pair of guiding links between the outer edge of the lowest step and the barrier.

Automatic safety and manual controls for operating the reciprocating motors in the two- and three-step lifts comprise electric circuits and hydraulic duct connections and solenoid valves. These circuits are programmed to include safe sequences and sensor switches to prevent operations in case the platform or the lift encounters undesirable obstacles. In the basic operation and conversion of the steps to a platform, the two-step lift is first operated to extend the lower step panel and then the converting mechanism is operated, while in the three-step lift only the converting mechanism is operated. In each embodiment the unfolding of the steps into the platform position occurs usually at an intermediate position for the elevator.

Once the step panels are in the platform position, the platform elevator lift motors are operated to move the platform either to its upper position for lowering a wheelchair or to its lower position for raising a wheelchair. In the latter instance, the next operation is of the extensible link for lowering the barrier into its ramp position. Then when the chair is on the lift, the ramp is automatically moved to its barrier position before the lift or elevator can be moved or operated. The circuitry also prevents operation of the extensible link, except when the platform is in its lowermost position. The sequence of operations of the reciprocating motors is controlled by well-known circuitry and although the reciprocating motors may be hydraulic or electric, their operation is controlled through electric switches and/or electro-magnetic valves. The source of the energy for the operations may be from electric generators and/or batteries, pumps and/or fluid pressure reservoirs.

OBJECTS AND ADVANTAGES

It is an object of this invention to produce a simple, efficient, effective and reliable automatic barrier for a step converted platform lift.

Another object is to produce such a lift which is sturdy and meets government safety specifications for handicapped persons in wheelchairs.

A further object is to produce an automatic barrier for either a two-step or three-step lift for adaption onto different size or height vehicles for handicapped persons.

A still further object is to produce an extendible lower step for a convertible two-step to platform lift, which extendible step has an automatic barrier.

BRIEF DESCRIPTION OF THE VIEWS

The above mentioned features, objects and advantages, and manners of attaining them, are described more specifically below by reference to embodiments of this invention shown in the accompanying drawings, wherein:

FIGS. 19 through 26 disclose in pairs on separate consecutive sheets side and bottom views of the extension of the lower step of the two-step lift, and corresponding positions of the automatic barrier controlled thereby, namely FIGS. 19 and 20 with the step in retracted position and barrier down; FIGS. 21 and 22 with the step partially extended, barrier still down; FIGS. 23 and 24 with step almost extended and barrier partially up; and FIGS. 25 and 26 with the step completely extended and barrier up in barrier position;

DETAILED DESCRIPTION OF PREFERRED EMBODIMENTS

A. Step Convertible Lifts

Figure 1:
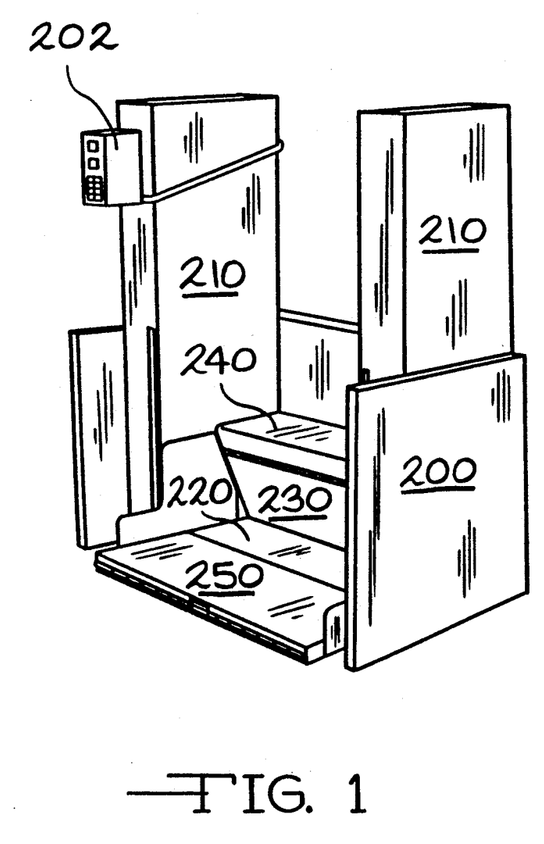
FIGS. 1 and 2 are perspective views of a two-step lift in its step and platform positions, respectively, according to one embodiment of this invention.
Figure 2:
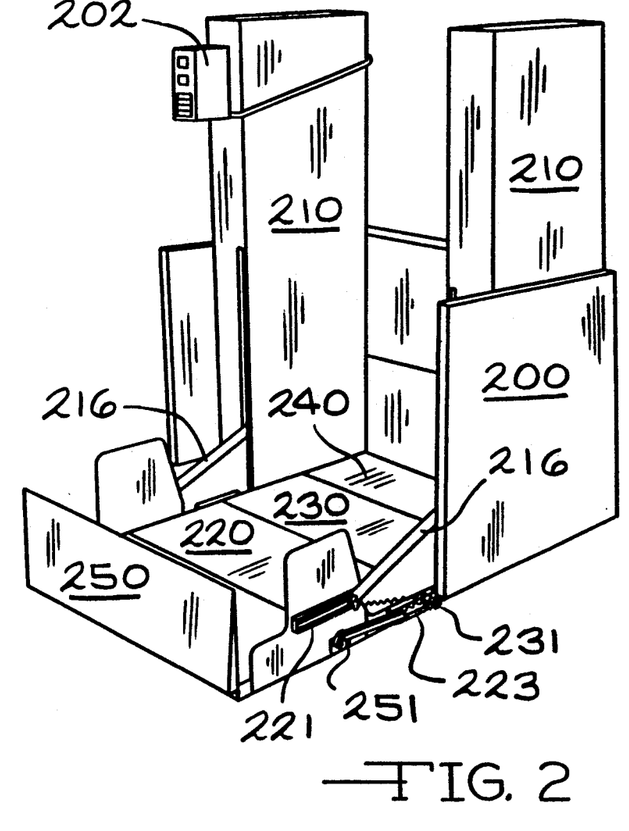
Figure 3:
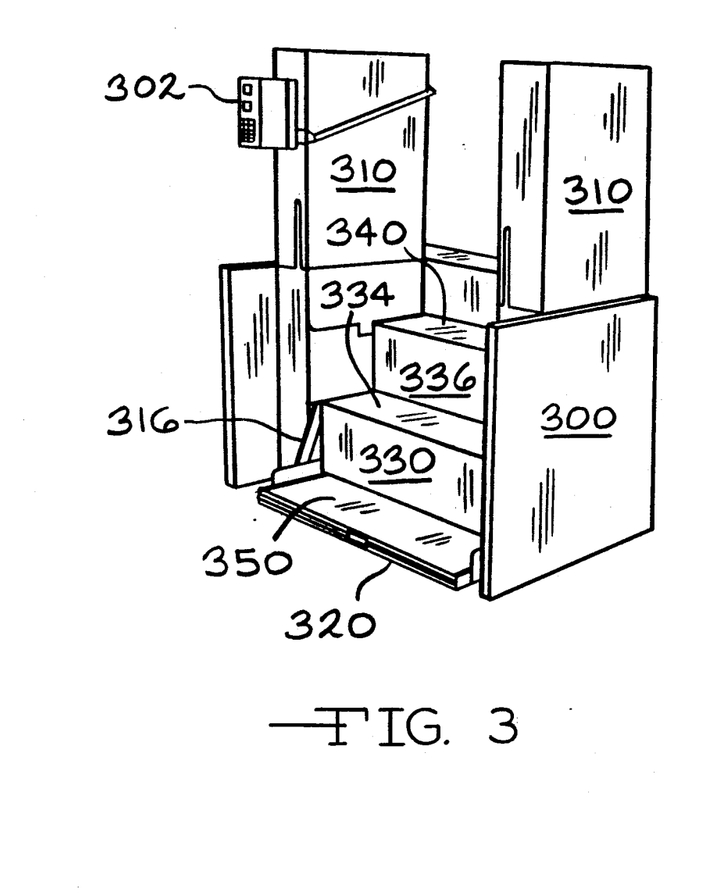
FIGS. 3, 4, 5 and 6 are perspective views of a three-step lift shown successively in step position, partly between step and platform positions, platform position raised, and in its lowest platform position.

Referring first to FIGS. 1 and 2 of the two-step convertible platform lift, there is shown the stationary sides 200 of a well in a vehicle in which the housing 210 for a U-shaped elevator is mounted. Also a portable pushbutton control box 202 is shown, which box may be located on the driver's instrument panel. Between the sides of the elevator housing 210 is the lower extendible step 220, riser 230 and top step 240. Folded on top of the bottom or extendible step 220 is the barrier 250 hinged along the outer edge of the extensible step 220 and shown folded onto the outer part of the retracted lower step 220 in FIG. 1. In FIG. 2 the two step panels and riser are in their platform position with the barrier 250 in its upright barrier position. There is also shown in FIG. 2 the supporting links 216 for the ends of extendible lower or bottom step panel 220. FIG. 2 also shows one of the slots 223 in which the stabilizing shaft 231 slides during the extension of the lower step panel 220.

Figure 4:
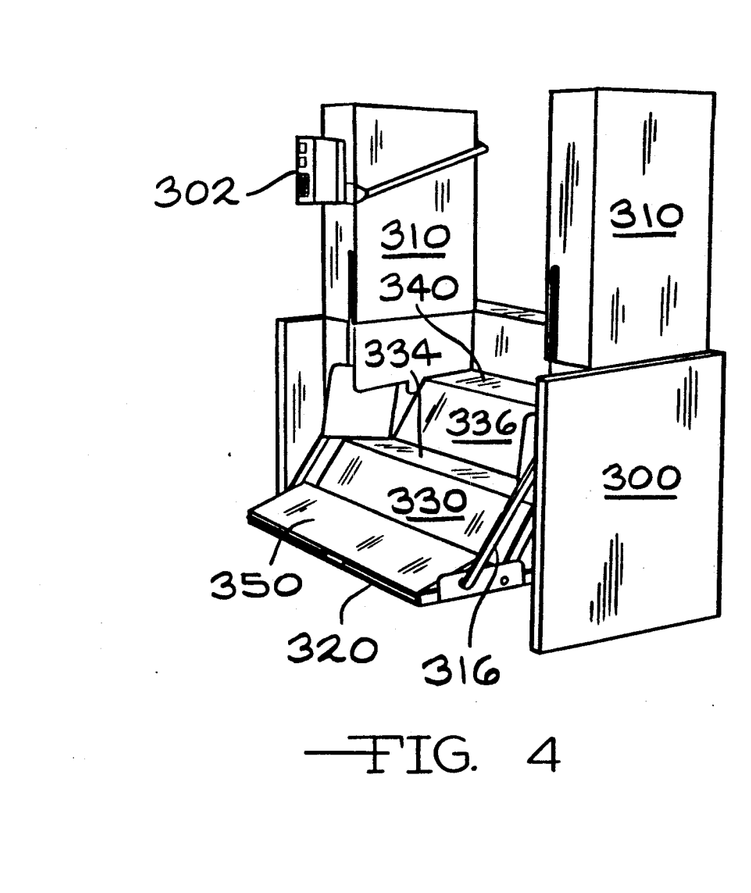
Figure 5:
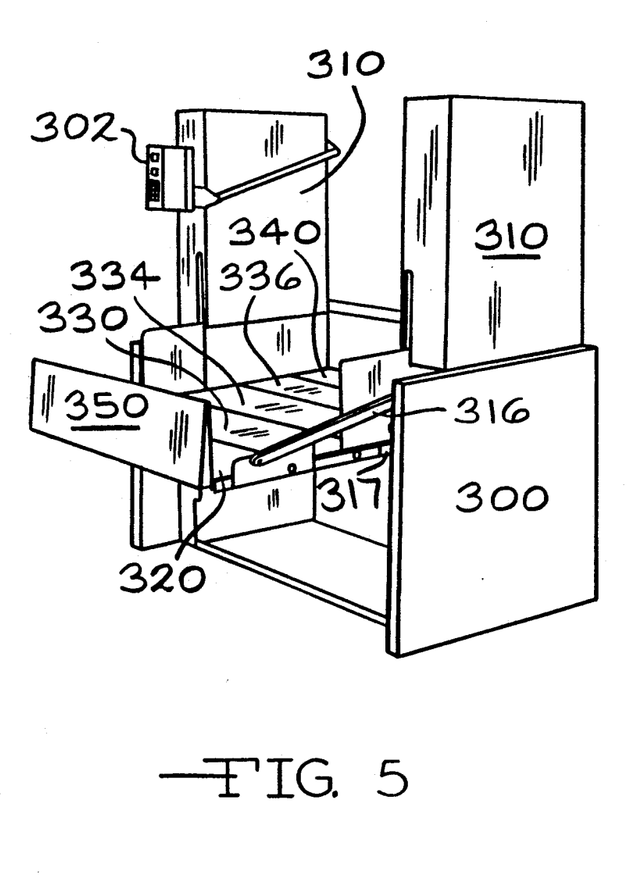
Figure 6:
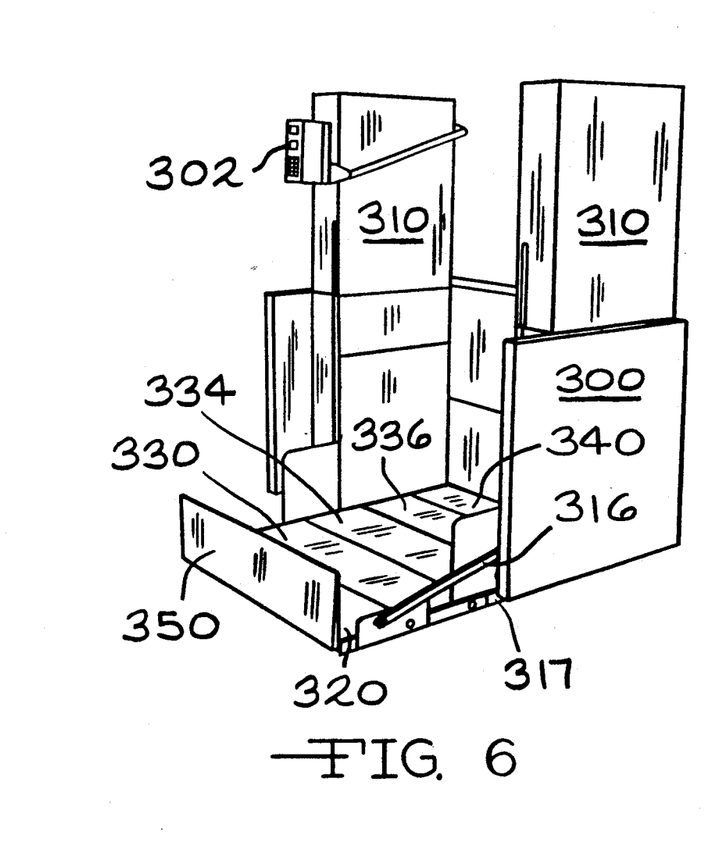

Referring next to FIGS. 3, 4, 5 and 6 of the three-step lift, there is shown the stationary well 300 of the vehicle in which the housing 310 for the U-shaped elevator is mounted. Also shown is the portable pushbutton control box 302. In the step position in FIG. 3, the lower step 320 is completely covered by the tread position of the automatic barrier 350, the lower riser 330 is hinged to the second or middle step 334 and its riser 336 is hinged to the inner edge of step 334 and to the outer edge of top or third step 340. In FIGS. 4, 5 and 6 the steps are first partly extended and then are in the platform position showing the lower step supporting link 316 and an intermediate supporting link 317 for the intermediate step panel 334. As soon as the step and riser panels are extended into their platform position as shown in FIGS. 5 and 6, the automatic barrier 350 raises into its barrier position.

B. The Elevator

Figure 7:
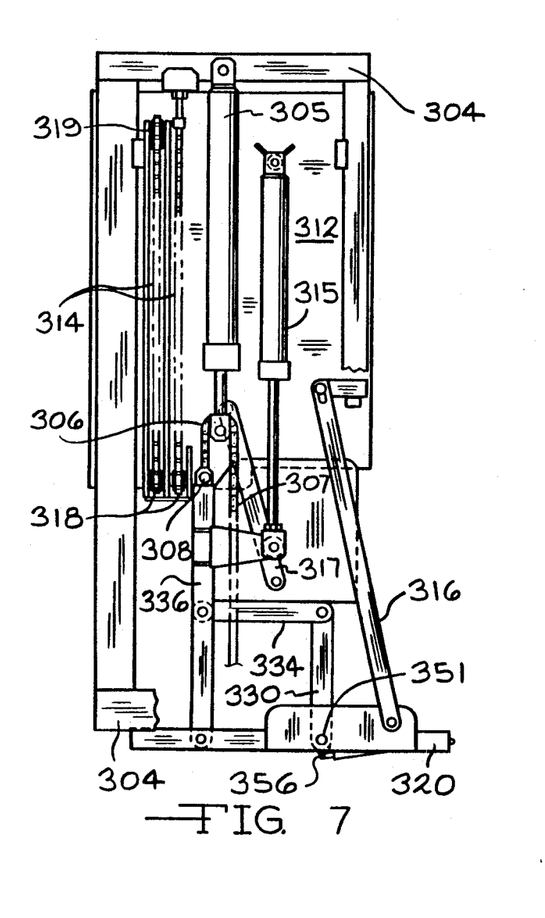
FIGS. 7, 8 and 9 are side views of the three-step lift showing the elevator and converting reciprocating motors, respectively, in the step position, halfway between the step and platform positions, and in a platform position.
Figure 8:
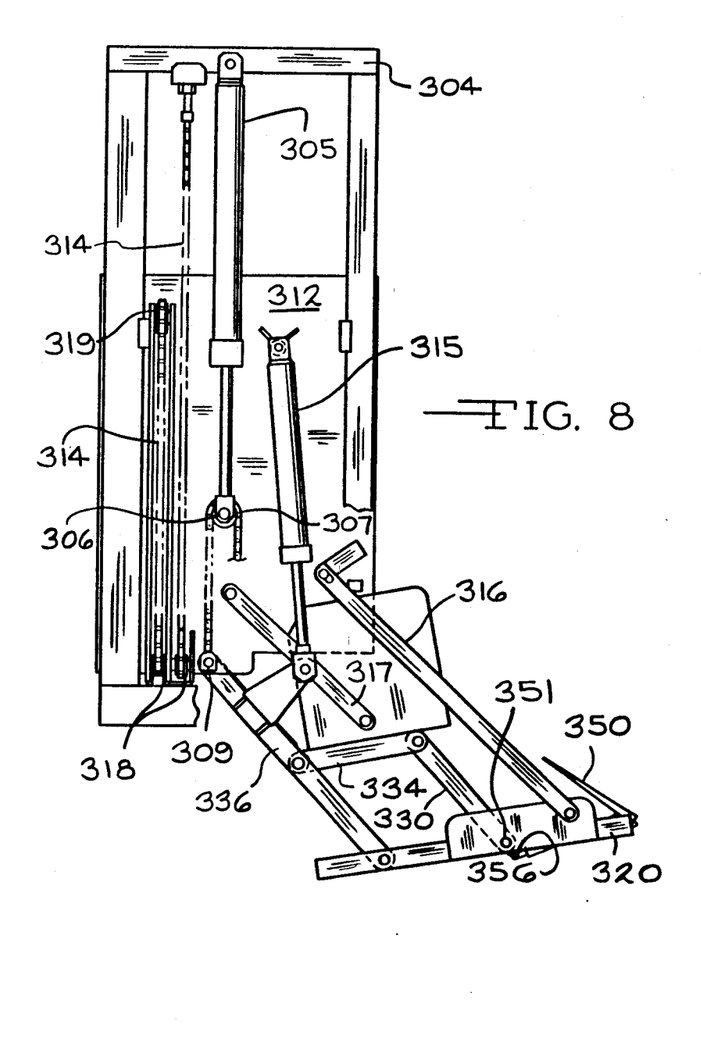
Figure 9:
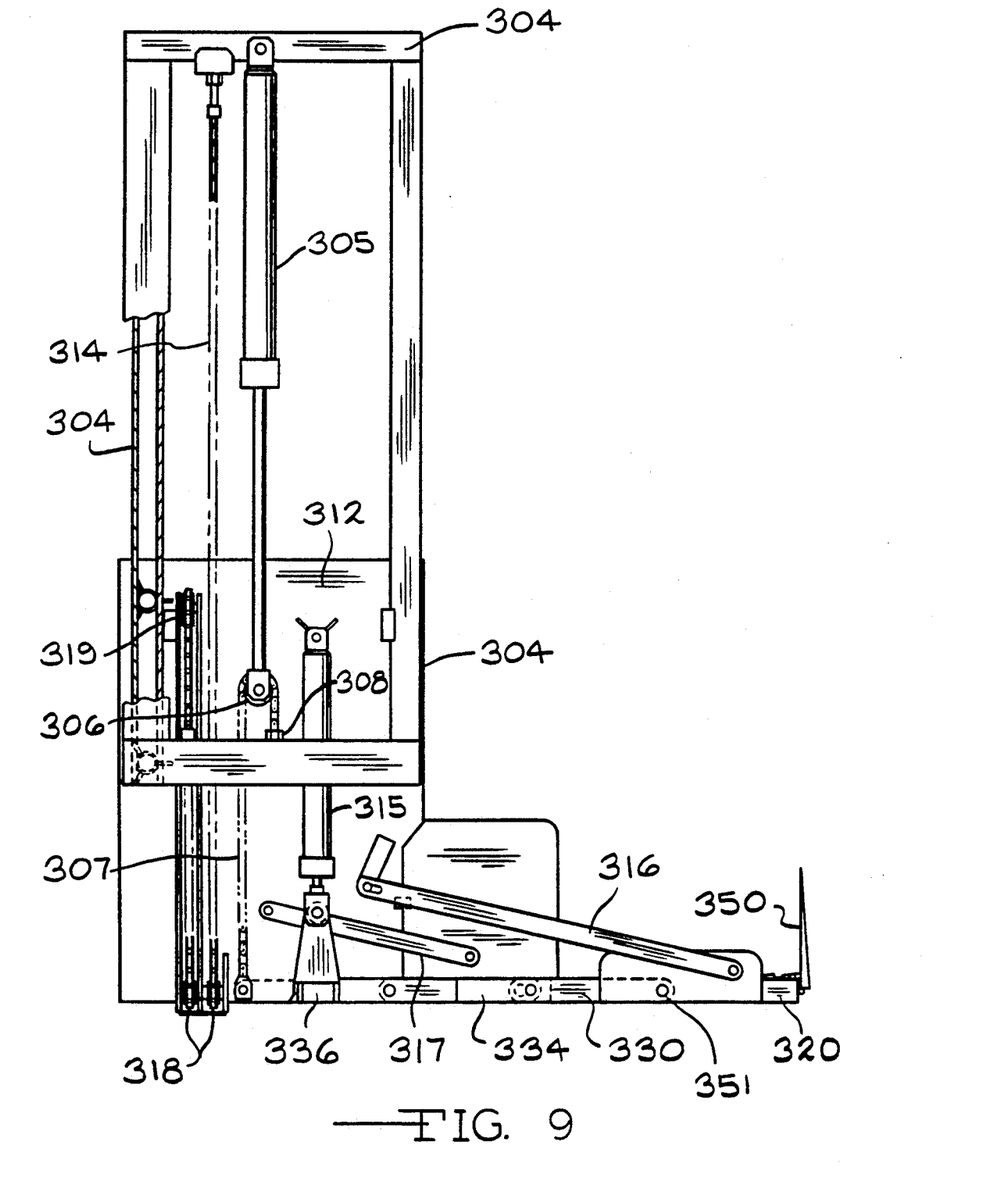

Referring now to FIGS. 7, 8 and 9 of the three-step lift, there is shown the relatively stationary frame 304 in which moves the U-shaped elevator frame 312 moved by the two side vertical reciprocating motors 305 connected to the top of the frame at their upper ends and at the lower ends having a sprocket wheel 306 over which runs a sprocket chain 307 anchored at one end to the bottom of the stationary frame 304 and at the other end to the elevator frame 312 at 309. The length of the lift reciprocating motor 305 is thus shortened to half the distance through which the elevator 312 can travel.

Similarly in FIGS. 10, 11, 12 and 13 there are shown similar views to FIGS. 7, 8 and 9 of the two-step lift frame 204 in which elevator 212 is moved vertically by the reciprocating motor 205 connected similarly to the frame 204 and the elevator 212 via sprocket chains 207.

Figure 14:
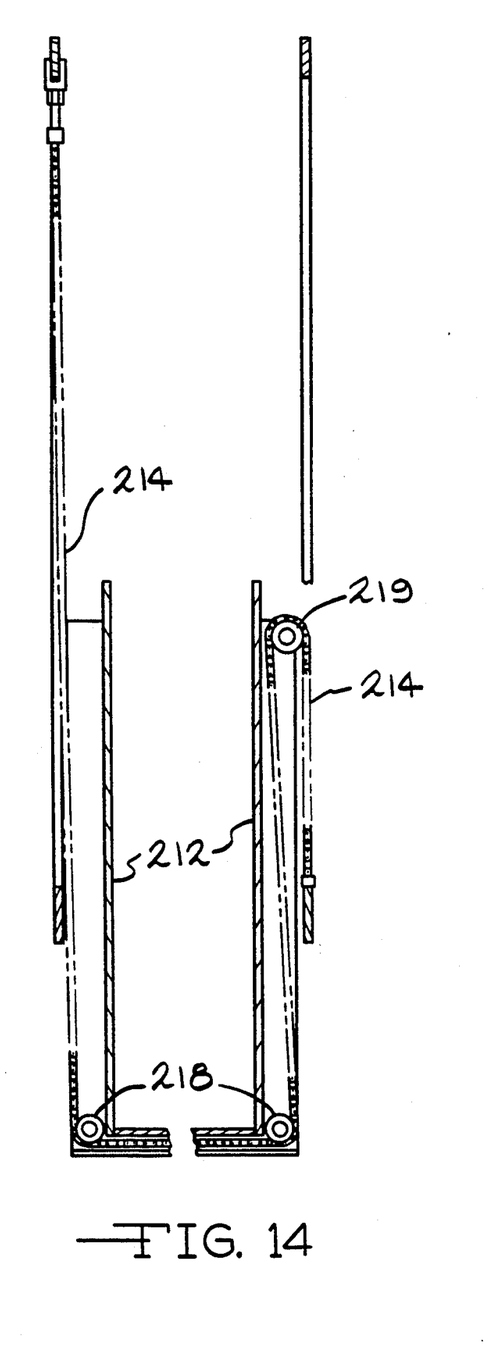
FIGS. 14 and 15 are sectional views taken along lines 14-14 of FIG. 13 and lines 15-15 of FIG. 10, respectively, showing the stabilizing sprocket chains between the elevator and its frame when the elevator is in its lowest and highest positions respectively.
Figure 15:
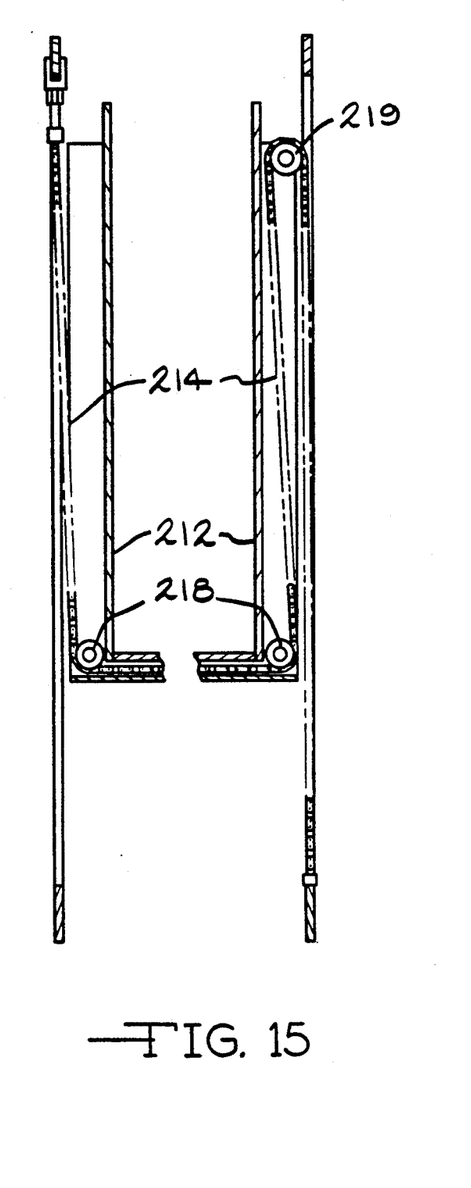

In order to stabilize the vertical movement of the elevators 212 and 312 there are provided similar stabilizing chains 214 and 314 as shown in FIGS. 14 and 15 with the elevator in its lower and upper positions, respectively. These chains 214 or 314 each comprise a pair of complementary sprocket chains and pulleys, opposite ends of which chains 214 or 314 are fastened or anchored to the top and bottom of opposite corners of the frames 204 and 304. In between, as shown in FIGS. 14 and 15, these chains 214 and 314 pass around sprocket wheels 218 and 318 located at the bottom corners of the elevator 212 and 312, and around sprocket wheels 219 and 319 at the opposite upper corners of the elevator from the upper stationary frame connection of that chain 212 or 312. Thus as the elevator 212 or 312 is moved up and down from its lower to its upper position, both sides of the elevator will move uniformly and at the same rate and be in the same position regardless of any inequality between the motion of the pair of reciprocating motors 205 or 305.

C. Reciprocating Converting Motor

Referring again to the FIGS. 7, 8 and 9 of the three-step lift, there is shown one of a pair of vertical reciprocating converting motors 315 pivotally connected at one end to the elevator U-shaped frame 312 and at the other end to a frontward extension on the upper riser panel 336. Thus, as the piston in the reciprocating motor 315 is raised, the steps and risers connected by parallelograms of links pivoted at their edge hinges start to unfold as shown in FIG. 8. Finally when the piston in motor 315 is completely retracted, the step and riser panels are in their platform position as shown in FIG. 9 with the automatic barrier 350 raised. In order to support the step and riser panels when in platform position as shown in FIG. 9, there is provided a pair of parallel links 316 and 317. The longer links 316 are connected from the sides of the elevator 312 to the ends of the outer or lower step, and the shorter links 317 are connected also from the elevator to the ends of the intermediate step 334. These links 316 and 317 are so connected to remain substantially parallel in both their vertical and almost horizontal positions.

Figure 10:
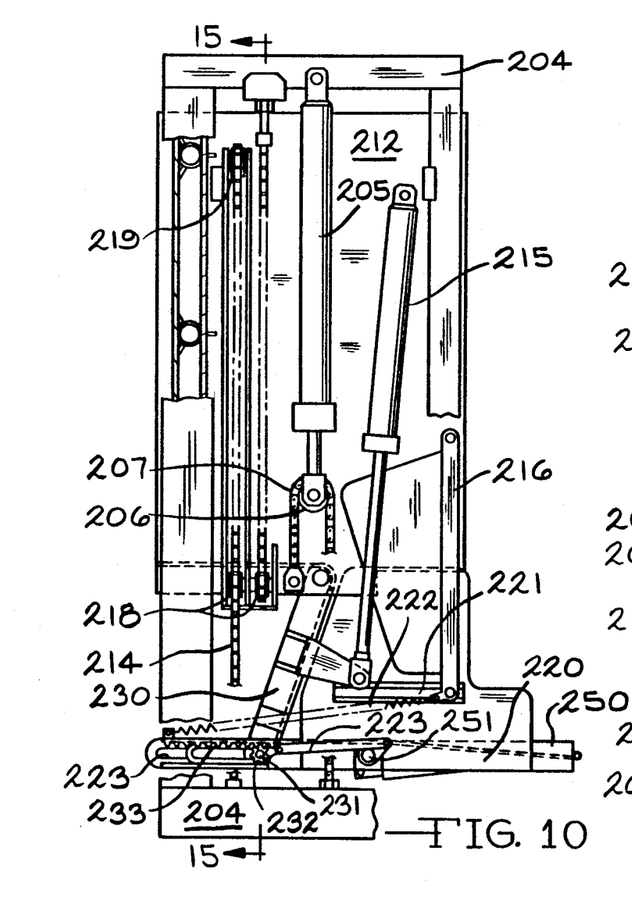
FIGS. 10, 11, 12 and 13 are side elevational views of the two-step lift showing the reciprocating elevator and converting motors, showing the lift successivelly in the step position, lower step extended position, platform position, and lowered platform position, respectively.
Figure 11:
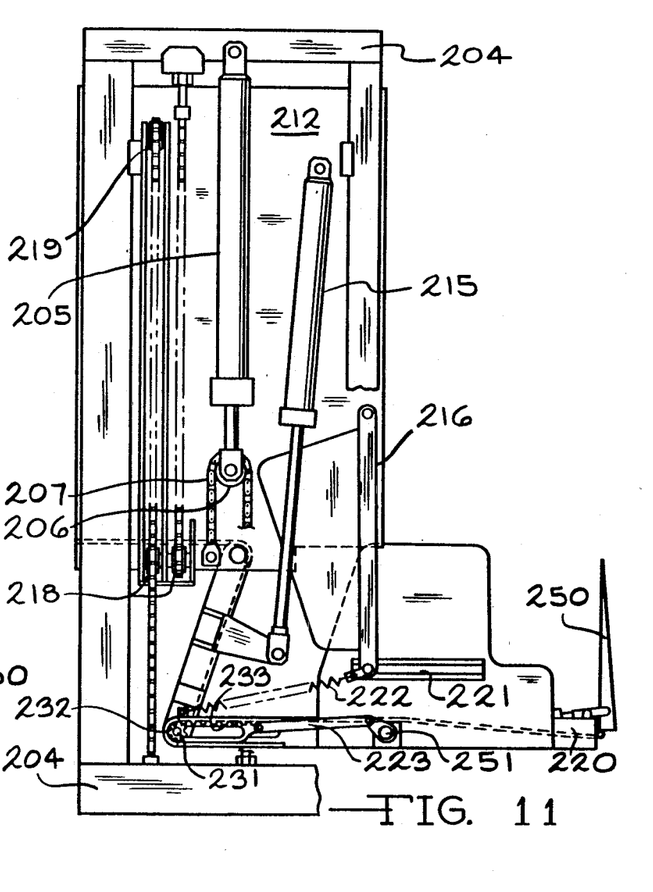
Figure 12:
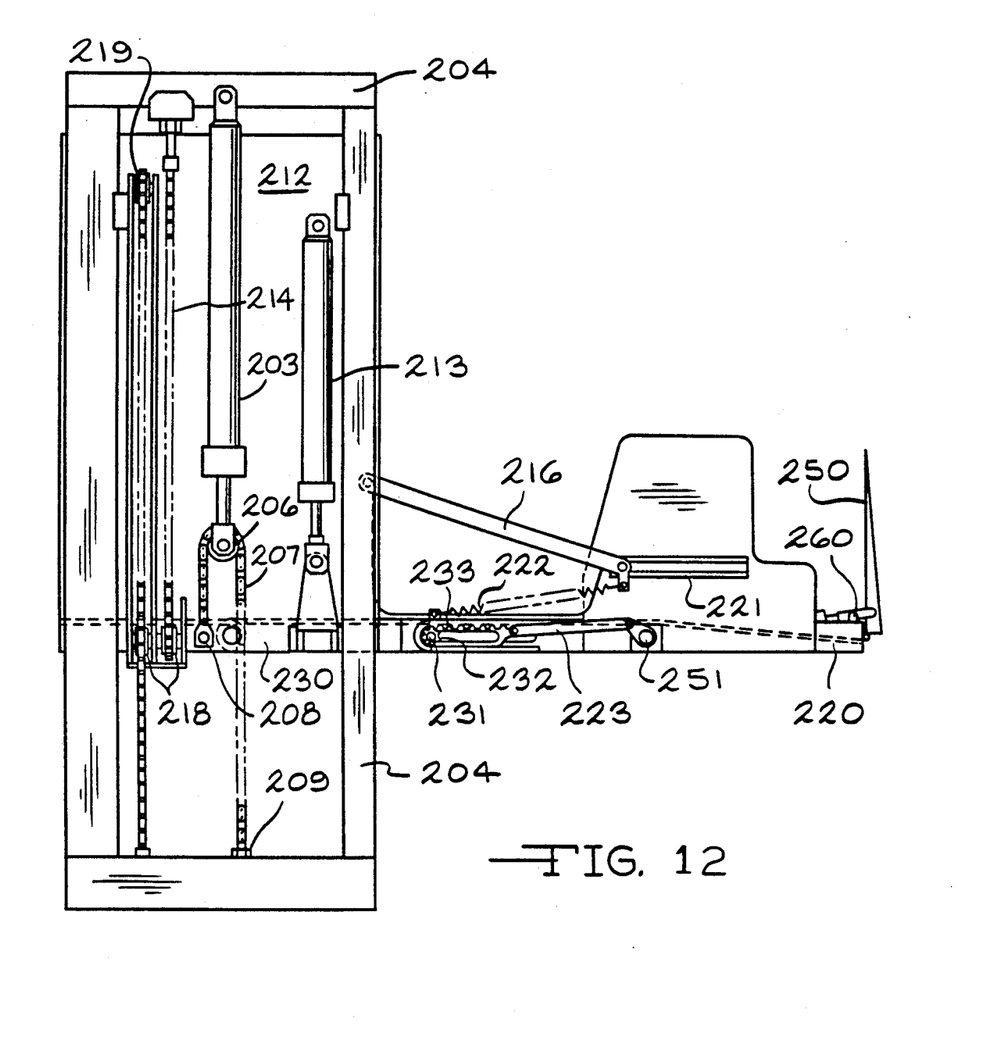
Figure 13:
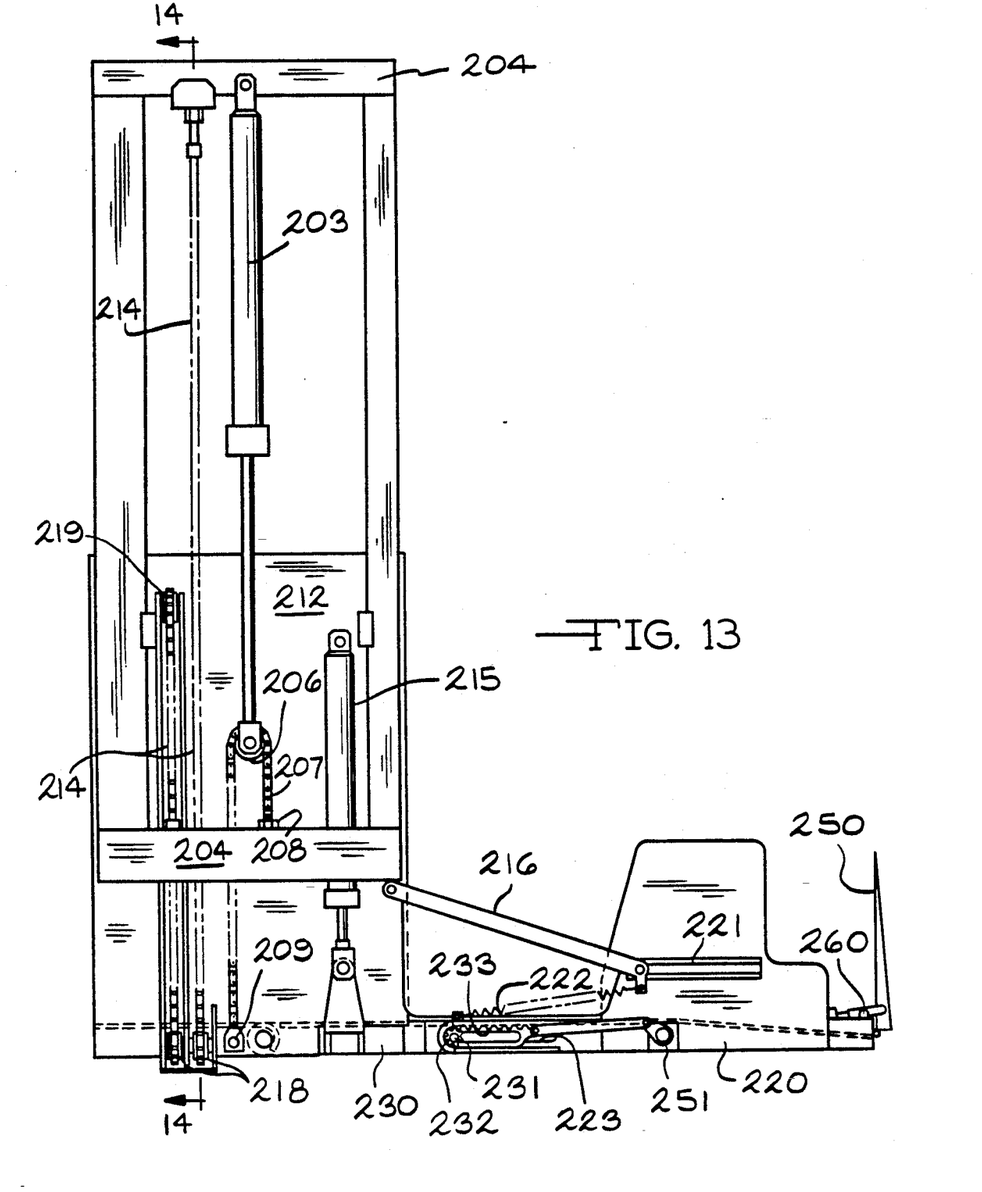

Similarly in the two-step lift shown in FIGS. 10, 11, 12 and 13, there is shown one of a pair of reciprocating converting motors 215, similarly partially connected between the elevator 212 and a forward extension on the sole riser panel frame 230. The extendible lower outer step 220 is swung outwardly after it has been extended into the position shown in FIG. 11 when the riser panel frame 230 is placed in its horizontal platform position as shown in FIGS. 12 and 13. Similarly, there is provided a supporting link 216 pivoted between the elevator 212 and the outer extended step 220, which due to the extension of the outer step rides in a slot 221 and is urged toward the elevator by a tension spring 222.

Thus the converting reciprocating motors 215 and 315 for the two- and three-step lifts, respectively, are connected to upper riser panels by means of outwardly extending end brackets on these panels for folding and unfolding the step panels between their step and platform positions.

D. Extendible Step

Figure 18:
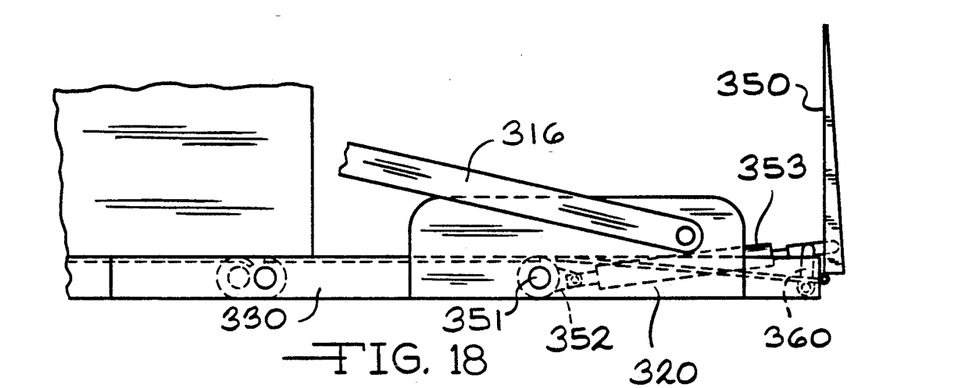
Figure 19:
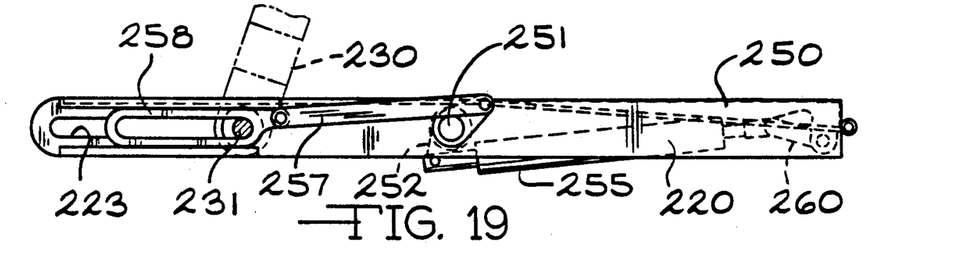
Figure 20:
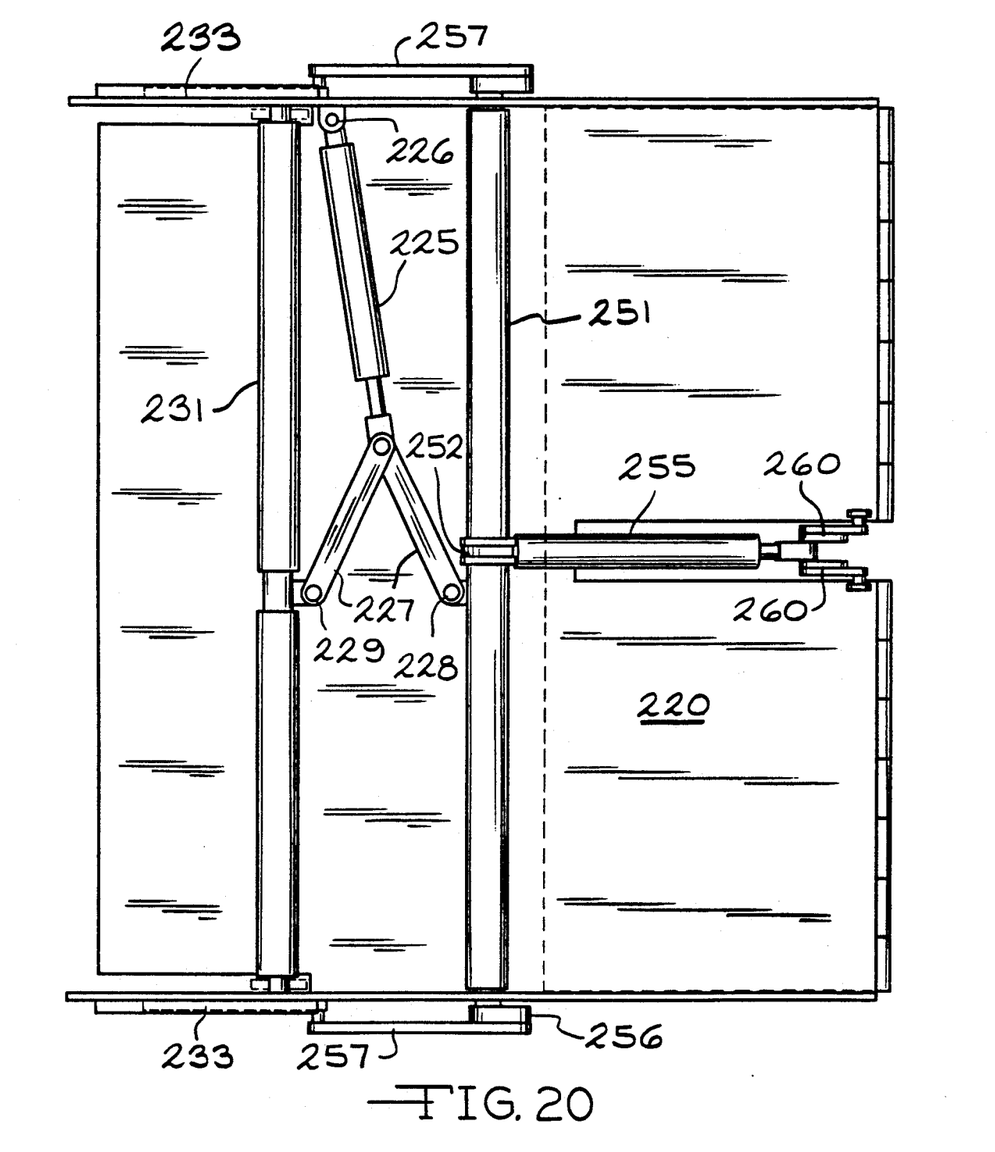
Figure 21:
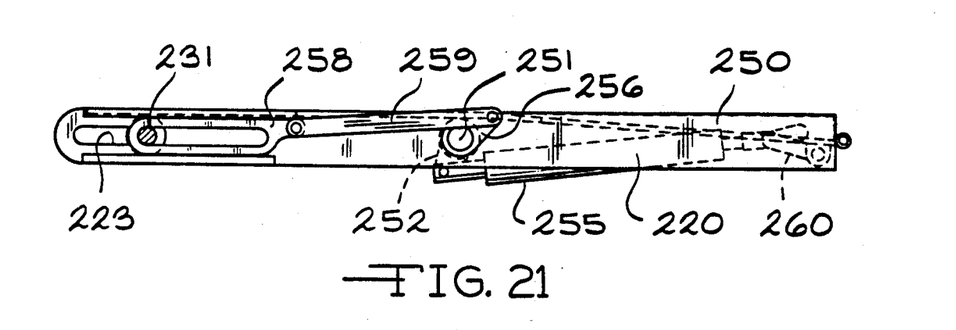
Figure 22:
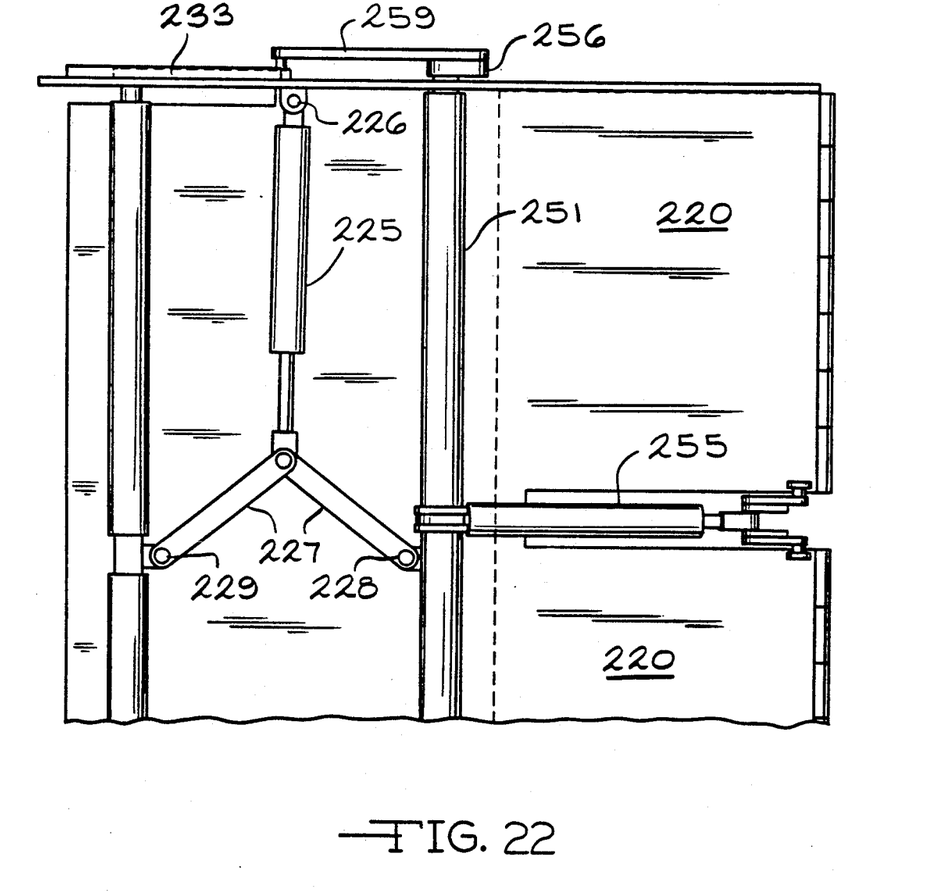
Figure 25:
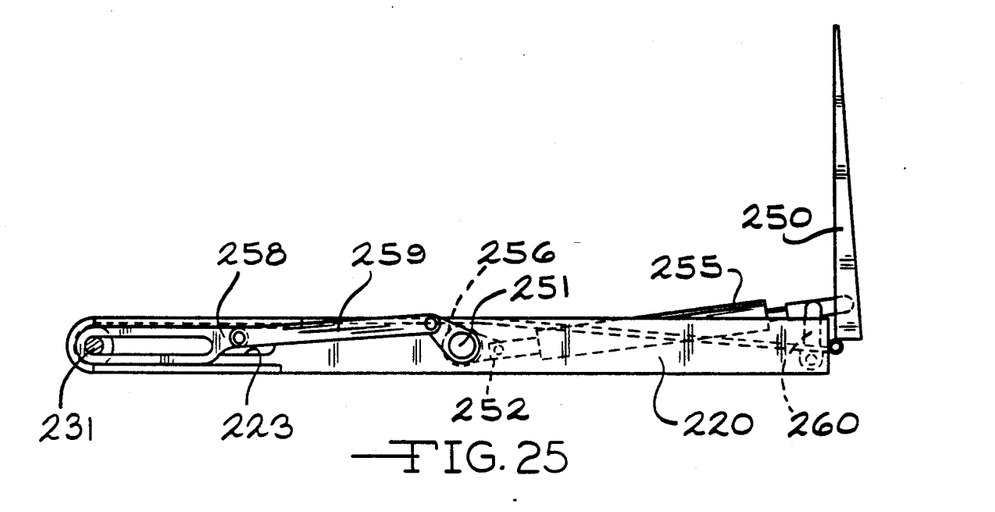
Figure 26:
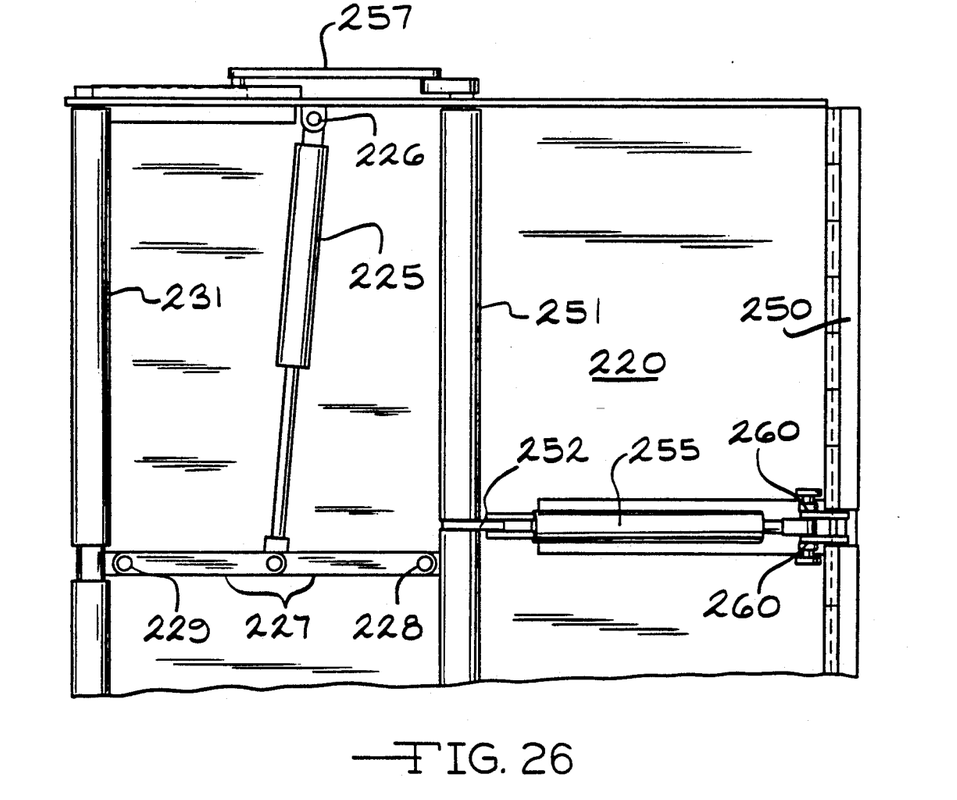

Referring now specifically to the two-step lift shown in FIGS. 10 through 13 and 16 through 26, there is shown a separate mechanism for extending the bottom or lower step 220 from its step position partly under the riser panel frame 230 as shown in FIGS. 10, 19 and 20 to that shown in FIGS. 11 and 25 and 26. To permit their extension, slots 223 are provided along opposite edges of the lower step panel frame 230, through which slots 223 the relatively stationary transverse shaft 231 extends for guiding the inner end of the lower extensible step 220. In order to stabilize the extended movement, each end of this shaft 231 may be provided with a keyed pinion gear 232 that meshes with a rack 233 adjacent one end of each slot 223.

As shown in FIGS. 20, 22, 24 and 26 of the underside of the lower outer extending step panel 220, there is provided a transverse reciprocating motor 225 anchored at one end 226 to one side of the extensible lower step frame 220 and pivotally connected to the center of links 227 of a toggle mechanism. The other ends of the links 227 are pivotally connected at 228 to the oscillatable shaft 251 and at 229 to the relatively stationary shaft 231. Thus, as the piston in the reciprocating motor 225 is extended, the toggle is spread apart until its links 227 are locked in alignment shown in FIG. 26 and the lower step 220 is fully extended.

E. Automatic Barrier

In each embodiment the automatic barriers 250 and 350 are operated by a single extensible link 255 and 355 connected from the barrier to an oscillating shaft 251 and 351, respectively, beneath the outermost lower step 220 and 320. Each of these shafts has integral radially extending arms or cranks 252 or 352 and 256 or 356, a part of riser frame 330.

Figure 16:
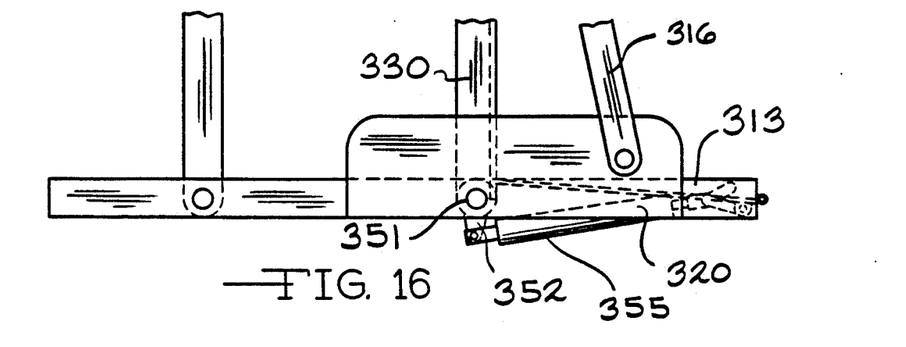
FIGS. 16, 17 and 18 are enlarged side elevational views showing the operation of the automatic barrier for the three-step lift, respectively, in step position, between step and platform positions, and in platform position with automatic barrier raised.
Figure 17:
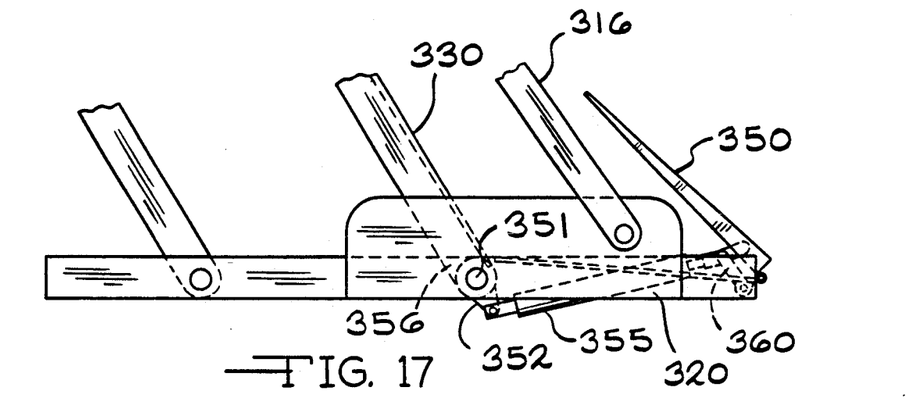

In the three-step lift, this mechanism is more clearly disclosed in FIGS. 16, 17 and 18 in which the transverse shaft 351 is connected to the extendible link 355 pivoted to the under-side of the barrier 350, which barrier in step position folds down on top of the outer step to act as a tread therefor as shown in FIG. 16. The other integral radially extending arm or arms on the shaft 351 comprise the side extensions 356 of the frame 330 for the first or lower riser, so that as the steps unfold, the shaft 351 is oscillated to move the other crank arm 352 to push on the extensible link 355 to raise the barrier 350 automatically. The sequence of this barrier raising is shown in FIGS. 16, 17 and 18. FIG. 18 shows the barrier 350 in its raised barrier position, when the two steps 320 and 340 and riser 330 are in the horizontal platform position.

Figure 23:
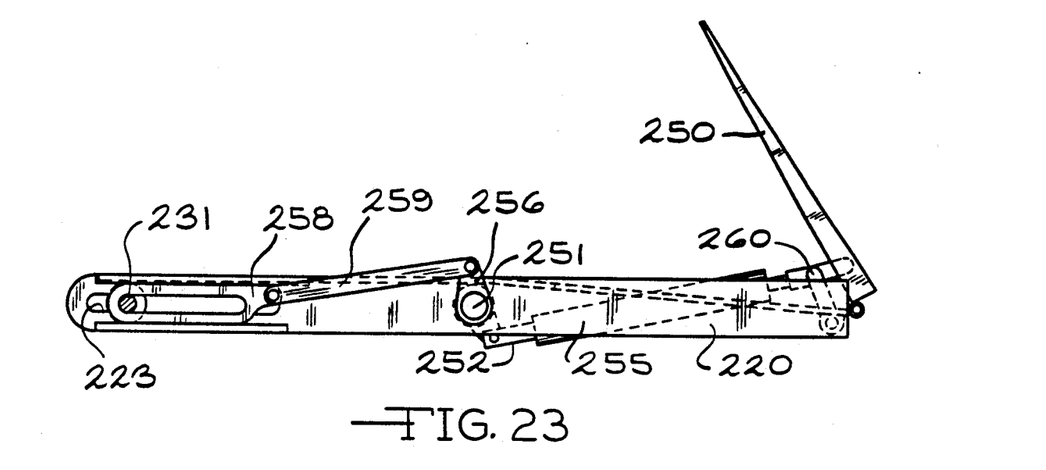
Figure 24:
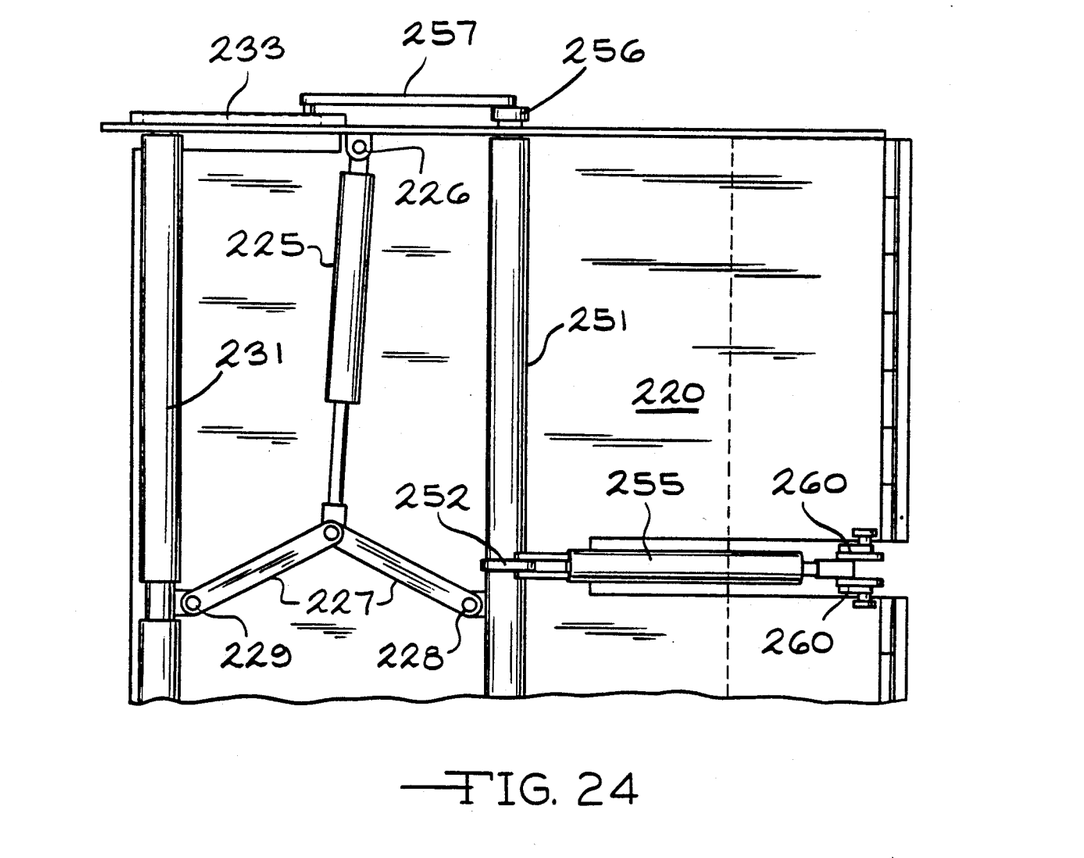

In the two-step lift, a similar shaft 251 is shown in FIGS. 19 through 26 with an integral central crank arm 252 pivotally connected to an extendible link 255, the other end of which link 255 is pivotally connected to the underside of the barrier 250 that similarly folds over the outer part of the extendible lower step 220. The other integral radially extending arms 256 are at the ends of the oscillatable shaft 251 and are pivotally connected to links 257 which are connected to slotted bars 258 having slots shorter than the slots 233 in the sides of the lower step frame, but whose bars 258 are also guided by the ends of the relatively stationary shaft 231. Since the oscillation of the shaft 251 by the integral crank arm 256 is a much shorter movement than that of the extension of the lower step 220, the slotted bar 258 has a much shorter slot therein so as to only engage the shaft 251 near the ends of the movement of the extendible step 220. At this time, however, when the relatively stationary shaft 231 nears the end of the shorter slot in the bar 258, the further extension of the bottom step 200 pulls on the link 257 as shown in FIG. 23 to start to raise automatically the barrier 250 via the extendible link 255. Then when the shaft 231 is at the ends of both slots 233 and in bar 258, the barrier 250 is in its fully raised position as shown in FIGS. 11, 12, 13 and 25. Conversely, the retraction of the barrier 250 to fold back over the outer tread of the lower step 220 occurs after the steps are folded from their platform position.

Thus the raising and lowering operation of both of the barriers 250 and 350 in the two-step and three-step lifts, are directly controlled by a single extendible link 255 and 355, which is connected to a rocking shaft 251 and 351 beneath the inner panel of the lower step 220 and 320, the rocking of the shaft 251 and 351 being controlled by the converting mechanism reciprocating motors 225 and 315, respectively.

F. Barrier Ramp Mechanism

Figure 27:
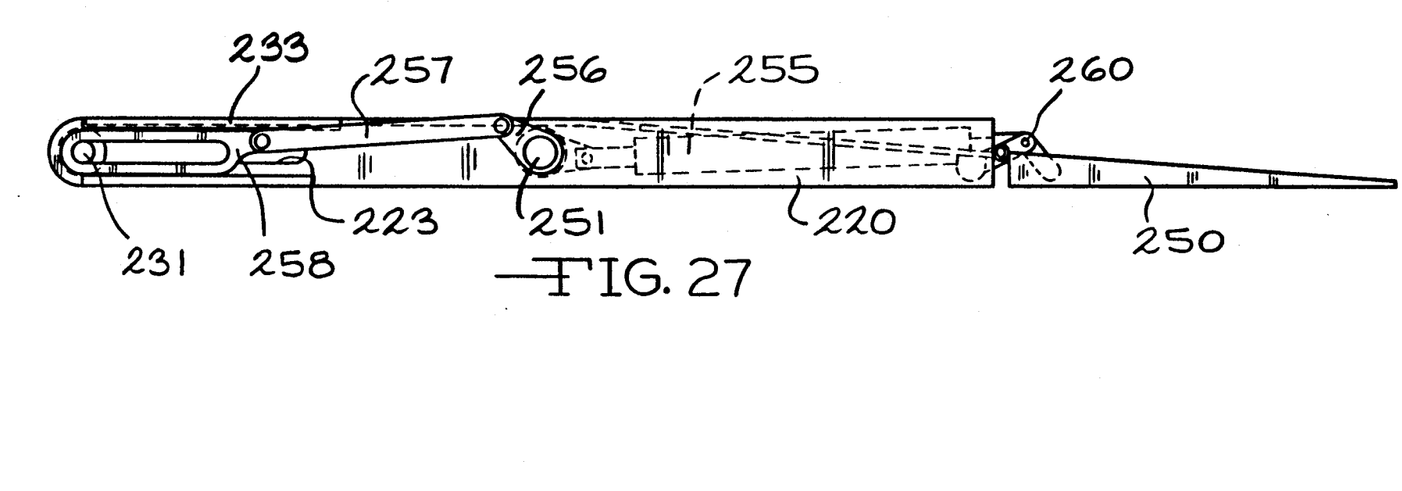
FIG. 27 is similar to FIG. 25 but with the extendible link extended and the barrier in its ramp position, which would be similar for the barrier of the three-step lift shown in FIG. 18.

Referring specifically to FIG. 27, as well as to FIGS. 11, 12, 13 and 17 through 26, there is shown in addition to the pivotal connection of the extendible link 220 or 320 to the underside of the barrier 250 or 350, respectively, a pair of additional links 260 and 360. These short links 260 and 360 are connected between the outer edge of the lower step and near the barrier end of the extendible links 255 and 355 to guide the barrier to form in a proper ramp position and shown in FIG. 27 when the extensible links 255 and 355 are extended. This extension moves the barriers 250 and 350 from their vertical barrier positions into their horizontal ramp positions as shown in FIG. 27. These links 260 and 360 are solely for guiding the ramp through an arc from its vertical position to horizontal position so that the operation of extendible link 255 or 355 will not cause the barrier to move into an inoperative position.

Although specific structure has been shown for an automatic barrier for both a two-step and three-step lift, it should be understood that other connections for performing the same function for oscillating the barrier operating shafts can have differently located crank arms.

While there is described above the principles of this invention in connection with the specific apparati, it is to be clearly understood that this description is made only by way of example and not as a limitation to the scope of this invention.

We claim:

1. In a wheelchair lift having steps convertible into a platform further comprising a barrier for said platform which is automatically raised when said steps are converted into said platform, the mechanism for operating said barrier comprising:
   1) means for converting said steps into said platform,
   2) a lower step,
   3) a shaft journalled in said platform under an inner part of said lower step, said shaft having at least two integral radially projecting arms,
   4) an extendible single link connected between one of said radially projected arms and said barrier, and
   5) means connected between said converting means and the other of said radially projecting arms for oscillating said shaft and thereby operating said extendible link to raise said barrier.

2. A lift according to claim 1 wherein said converting means comprises a reciprocating motor means.

3. A lift according to claim 2 wherein said steps include a riser and said reciprocating motor means is connected to said riser.

4. A lift according to claim 1 including means to extend horizontally said lower step.

5. A lift according to claim 4 wherein said lower step extending means includes a toggle connection between said shaft and said lower step.

6. A lift according to claim 5 wherein said means for oscillating said shaft comprises a link means between said other radially projecting arm and said lower step extending means.

7. A lift according to claim 4 including a rack and gear stabilizing mechanism for the extension of said lower step.

8. A lift according to claim 1 wherein said radially projecting arms are crank arms.

9. A lift according to claim 1 wherein said extendible link is a reciprocating motor means for moving said barrier to and from a ramp position.

10. A lift according to claim 9 including link means to guide the extension of said extendible link between said bottom step and said extendible link for guiding said barrier to its ramp position.

11. A lift according to claim 1 including a lower riser supporting frame wherein said other radially projecting arm comprises part of said supporting frame.

12. A lift according to claim 1 including a sprocket means for stabilizing said lift when in its platform position.

13. In a convertible step-to-platform wheelchair lift for vehicles, an extendible lower step comprising:
   A) a tread portion having a barrier at an outer end thereof,
   B) a pair of parallel side arms extending rearwardly from an inner end of said tread portion, said arms having longitudinal closed end slots therein for limiting a sliding movement of said lower step therealong,
   C) a relatively stationary transverse shaft in said platform extending orthogonally of said side arms through said slots thereby limiting the sliding movement of said lower step, said shaft having a crank arm thereon,
   D) a reciprocating motor means for extending and retracting said lower step within the limits of said slots, and
   E) extendible link means connected to said crank arm for automatically raising said barrier into its barrier position when said lower step is extended.

14. A lift according to claim 13 including racks fastened to each said arm adjacent its slot and pinions keyed to each end of said shaft, meshing with said racks for stabilizing the movement of said step.

15. A lift according to claim 13 wherein said motor means is orthogonal of said arms and operates toggle links between said shaft and said step.

16. A lift according to claim 13 wherein said extendible link means comprises a single extendible link for moving said barrier into a ramp position and back into its barrier position when said lower step is extended.

* * * * *